United States Patent [19]

Mizuhara

[11] Patent Number: 5,577,655
[45] Date of Patent: Nov. 26, 1996

[54] FLEXIBLE METAL-CONTAINING TAPES OR FILMS AND ASSOCIATED ADHESIVES

[75] Inventor: Howard Mizuhara, Hillsborough, Calif.

[73] Assignee: The Morgan Crucible Company plc, Berkshire, England

[21] Appl. No.: 346,784

[22] Filed: Nov. 30, 1994

[51] Int. Cl.⁶ .................................................. B23K 35/368
[52] U.S. Cl. ...................... 228/56.3; 428/327; 428/331; 428/421
[58] Field of Search ..................... 428/327, 328, 428/331, 421, 422, 450, 472.2, 471; 228/56.3, 119

[56] References Cited

U.S. PATENT DOCUMENTS

| | | | |
|---|---|---|---|
| 3,293,072 | 12/1966 | Doolittle et al. | 428/430 |
| 3,743,556 | 7/1973 | Breton et al. | 228/121 |
| 3,904,382 | 9/1975 | Beltran et al. | 428/553 |
| 3,917,149 | 11/1975 | Breton et al. | 228/124.1 |
| 3,975,165 | 8/1976 | Elbert et al. | 428/550 |
| 4,073,639 | 2/1978 | Duvall et al. | 75/255 |
| 4,188,237 | 2/1980 | Chasteen | 134/2 |
| 4,325,754 | 4/1982 | Mizuhara | 148/22 |
| 4,405,379 | 9/1983 | Chasteen | 134/2 |
| 4,477,527 | 10/1984 | Grosner | 428/401 |
| 4,624,860 | 11/1986 | Alber et al. | 427/46 |
| 4,726,101 | 2/1988 | Draghi et al. | 228/119 X |
| 5,263,641 | 11/1993 | Rafferty et al. | 228/220 |

*Primary Examiner*—Kenneth J. Ramsey
*Attorney, Agent, or Firm*—Dean W. Russell; Kilpatrick & Cody

[57] ABSTRACT

Flexible metal tapes and adhesives are disclosed. The tapes comprise one or more alloy powders, PTFE powder, and a water-based casting vehicle, while the adhesives include inorganic substances such as sodium silicate, boric acid, sodium tetraborate, sodium fluoride, or sodium aluminum fluoride as well as pastes having compositions similar to the flexible metal tapes. The tapes and adhesives shrink minimally linearly when brazed to metal substrates, avoiding surface cracks that often result from shrinkage. The adhesive additionally retains the tape in place on the substrate, regardless of orientation, both before and during brazing.

8 Claims, 1 Drawing Sheet

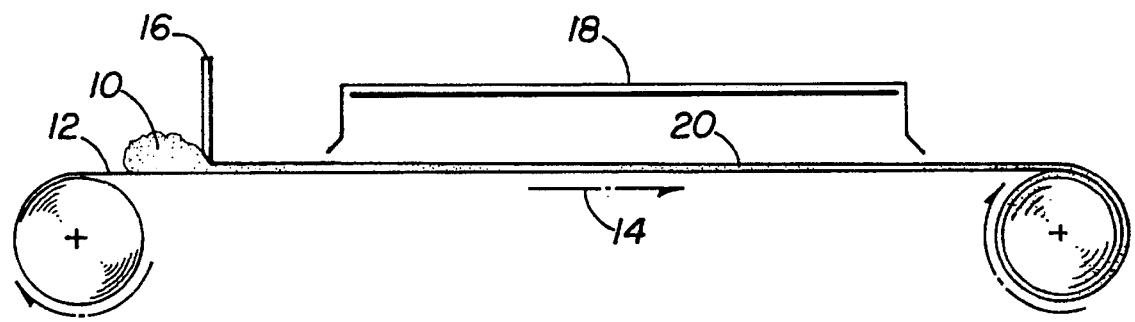
FIG 1
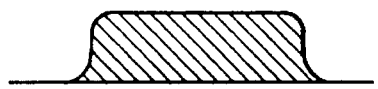 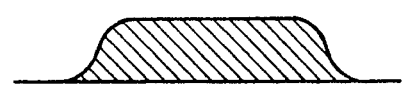
FIG 2A     FIG 2B
FIG 2C     FIG 2D

FLEXIBLE METAL-CONTAINING TAPES OR FILMS AND ASSOCIATED ADHESIVES

FIELD OF THE INVENTION

This invention relates to tapes or films containing metals and to adhesives associated with such tapes or films, which products are particularly useful for repairing worn metallic components.

BACKGROUND OF THE INVENTION

Many metallic components wear in use. Vanes of the compressor sections of aircraft engines, for example, may develop cracks or sustain other damage over time. Because the cost of replacing these vanes is relatively high, they often are reconditioned or otherwise repaired for further use. Those with severely damaged trailing edges typically have the injured portions removed and similar, undamaged pieces welded in place. The welded pieces thereafter may be ground, albeit laboriously, to match the shapes of those removed.

Alternatively, for some worn vanes a flat, pre-sintered boron-containing sheet with greater than 99% density may be cut to the required size, tack welded to the vane, and then brazed in place. It too must be ground to duplicate the original shape of the vane, although such grinding often is minimal. However, if substantial quantities of boron are used as a melting-point depressant, an unacceptable amount of boron may be transferred to the substrate.

Extrudable pastes additionally may be used in conjunction with "green" (i.e. not sintered or melted) metal-loaded sheets. Such pastes, containing the same metal powders as their associated sheets, are applied along the edges of the green sheets to encase areas no longer covered when the sheet shrinks during brazing. These pastes again often add undesirable quantities of boron to the vanes, however and, following brazing, require substantial grinding to achieve required shapes.

U.S. Pat. No. 3,743,556 to Breton, et al. discloses yet another process for coating a metallic substrate with a composition of a hard abrasive material dispersed in a hard metal matrix. According to the Breton patent (at column 1, lines 61–71), the invention disclosed therein consists of laying on the substrate a film of a desired thickness of metal or alloy matrix material in an organic binder. A second film of powdered filler such as tungsten carbide in an organic binder is placed on the substrate contiguous to the filler filled film. The filler material is characterized as being wetted by the matrix metal or alloy in the molten state. This assembly is heated to decompose the binder and melt the matrix metal or alloy which is infused by capillary action into the filler layer. Cooling yields a coated substrate having a filler filled, void-free coating of the matrix material.

The film includes polytetrafluoroethylene (PTFE) and is rolled rather than cast. The Breton patent discloses as adhesives solely organic substances that decompose and evaporate at relatively low temperatures (e.g. 200° C. for polymethacrylate), precluding adhesion of the film to the substrate when opposed by gravity during brazing, for example. It additionally neither teaches nor suggests avoidance of surface cracks caused by linear shrinkage.

U.S. Pat. No. 5,263,641 to Rafferty, et al. describes a brazing paste including an alloy powder, a binder, and a minor amount of finely-ground powered PTFE. Smearing the paste onto the substrate using a spatula or other device and then using it to bond a metal object to the substrate purportedly eliminates the need to coat the substrate with nickel to avoid formation of oxides. The Rafferty patent fails to disclose use of any dried materials such as tapes or films, however. As with the Breton patent, moreover, the Rafferty patent neither teaches nor suggests either using an inorganic adhesive prior to heating or any mechanism for avoiding surface cracks caused by shrinkage. This lack of disclosure of crack avoidance is consistent with the remainder of the Rafferty patent, which contemplates use of only (low melting point) alloys that melt completely during brazing.

SUMMARY OF THE INVENTION

The present invention, by contrast, provides both a suitable adhesive and crack-avoiding mechanism for a flexible, organic bonded metal tape. The castable tape consists of one or more alloy powders (generally two having dissimilar melting points), PTFE (or other appropriate inert organic) powder, and a water-based casting vehicle. Suitable alloys include but are not limited to AMS 4783B, sold by Wesgo Inc. 477 Harbor Boulevard, Belmont, Calif. 94002 under the name "Cocrownibsi," and X-40, PWA 1185-1, PWA 1185-2, D-15, and Rene 80 available from the Praxair Surface Technologies division of Union Carbide Corporation, 1555 Main Street, Indianapolis, Ind. 46224.

When two or more alloys are combined as part of the present invention, one typically has a high melting point (i.e. 1300°–600° C.), while the other, with a lower melting point (i.e. 1000°–1200° C.), functions as the brazing alloy. Useful brazing alloys include (but again are not limited to) those alloys listed at column 2, lines 22–45 of the Rafferty patent, which patent is incorporated herein in its entirety by this reference. Because the high temperature alloy may not melt completely during brazing, absent use of the invention surface cracking may result.

Adhesives encompassed by the present invention include inorganic substances (or mixtures of substances) such as sodium silicate, boric acid, sodium tetraborate, sodium fluoride, and sodium aluminum fluoride as well as pastes, with or without sodium silicate, having compositions similar to the flexible metal tapes. All of these adhesives wet and dissolve the surface layer of the green tape to provide reliable bonding to the substrate. Thus, applying one of the foregoing adhesives to the substrate helps retain the tape in place—even while inverted (i.e. with the tape lying below the substrate to which it is attached)—while the structure is dried and brazed. The tapes and adhesives of the present invention further do not shrink linearly to any significant degree and, accordingly, the brazed tape is generally free of surface cracks caused by shrinkage.

It is therefore an object of the present invention to provide a flexible tape composed of powder of at least one alloy.

It is another object of the present invention to provide a flexible tape that, when brazed to a metal substrate, shrinks minimally and thereby avoids surface cracks.

It is an additional object of the present invention to provide means for repairing worn metallic components without substantial grinding requirements.

It is a further object of the present invention to provide a flexible tape consisting of one or more alloy powders, PTFE powder, and a water-based casting vehicle.

It is yet another object of the present invention to provide a substance for adhering the tape to the substrate prior to and during brazing.

It is, moreover, an object of the present invention to provide adhesives composed of inorganic substances such as sodium silicate, boric acid, sodium tetraborate, sodium fluoride, or sodium aluminum fluoride as well as pastes having compositions similar to the flexible tapes.

Other objects, features, and advantages of the present invention will become apparent with reference to the remainder of the written portion and the drawings of this application.

BRIEF DESCRIPTION OF THE DRAWINGS

FIG. 1 is a representation of an exemplary line for casting flexible tape of the present invention.

FIG. 2A–D are sketches presenting end views of flexible tapes brazed to metal substrates according to EXAMPLE 5 of the application.

DETAILED DESCRIPTION

The present invention includes a flexible, organic bonded metal tape or film and an associated adhesive. The tape and adhesive are particularly suited for repairing worn components of aircraft engines, although they may be used whenever bonding to a metal substrate is desirable or required. The flexible tape is formed of one or more alloy powders, PTFE (or other appropriate organic) powder, and a water-based casting vehicle (an organic binder), while acceptable adhesives include inorganic substances (or combinations of substances) such as, but not limited to, sodium silicate, boric acid, sodium tetraborate, sodium fluoride, and sodium aluminum fluoride. The adhesives may be in solution (in water). Alternatively, the adhesives may be pastes having compositions similar to the flexible metal tapes with or without PTFE or added sodium silicate.

As shown in FIG. 1, metal powder and a casting vehicle are combined to form casting mix 10 and cast onto a continuous length of backing 12. Backing 12, typically a roll of Mylar film, advances in the direction of arrow 14, causing casting mix 10 to contact doctor blade 16. The distance of doctor blade 16 above backing 12 determines the thickness of casting mix 10 and may be adjusted as necessary or desired. As casting mix 10 advances it passes adjacent heater 18 and is dried, thereby producing flexible tape 20. Typical thicknesses of tape 20 range between 20–80 mils.

Unlike the extrudable paste of the Rafferty patent, casting mix 10 must contain metal powder suspended in a low viscosity, pourable slurry that neither spreads nor dewets excessively when cast on backing 12. Casting mix 10 additionally must dry without cracking and produce tape 20 that not only evidences some resistance to tears but also is flexible and may be easily cut with, for example, a razor blade. Tape 20 further must not curl when sintered.

Although the ratio of metal powder to organic binder depends on the density of the powder, typical percentages (by weight) of components of the casting mix 10 are 80–90% metal powder and 20–10% casting vehicle, with the casting vehicle containing 4–12% PTFE. After drying, flexible tape 20 generally comprises 95–99% metal powder and 5–1% solids remaining from the casting vehicle. Of the total weight of dried tape 20, approximately 0.4–3.0% is PTFE.

For dried tape 20, metal (assuming a density of 8.0 g/cc) generally comprises approximately 10–11.25 cc, or 80–90% of the total volume of each one hundred grams of material, and the solids remaining from the casting vehicle comprise approximately 2.4–1.2 cc, or 20–10% of the total volume for each one hundred grams. Of the volume of the casting vehicle present in dried flexible tape 20, approximately 18–40% is PTFE (assuming a PTFE density of 2.3 g/cc). Thus, an exemplary flexible tape 20 formed from casting mix 10 containing 80 grams of metal and 20 grams of casting vehicle may comprise, after drying, 10 cc metal and 2.43 cc casting vehicle, with the casting vehicle composed of 0.67 cc polyacrylic resin, 0.89 cc glycerol, and 0.87 cc PTFE. In an alternative dried tape 20 formed from casting mix 10 containing 90 grams of metal and 10 grams of casting vehicle, metal comprises 11.25 cc and the casting vehicle comprises 1.23 cc of the total volume, with the casting vehicle including 0.34 cc polyacrylic resin, 0.45 cc glycerol, and 0.44 cc PTFE. A typical density of tape 20 is 5.1 g/cc.

As noted above, the metal powder itself may be composed of one or more commercially-available alloys, including (but not limited to) AMS 4783B, X-40, PWA 1185-1, PWA 1185-2, D-15, and Rene 80. Nominal compositions of these exemplary alloys, by weight percent, follow:

| | |
|---|---|
| ANS 4783B | 17.0 Ni, 19.0 Cr, 8.0 Si, 0.8 B, 4.0 W, 0.4 C, balance Co |
| X-40 | 24.5–26.5 Cr, 9.5–11.5 Ni, 7.0–8.0 W, 0.45–0.55 C, 0–2.0 Fe, 0–1.0 Mn, 0–1.0 Si, 0–0.25 Zr, 0–0.04 P, 0–0.04 S, 0–0.03 O2, 0–0.03 N$_2$, 0–0.005 Se, 0–0.15 total all other elements (TAO), balance Co |
| PWA 1185-1 | 38.5–41.5 Ni, 23.5–25.5 Cr, 2.65–3.25 B, 0–0.5 C, balance Co |
| PWA 1185-2 | 22.5–24.25 Cr, 9.0–11.0 Ni, 6.5–7.5 W, 3.0–4.0 Ta, 0.15–0.3 Ti, 0.3–0.6 Zr, 0.55–0.65 C, 0–0.1 Mn, 0–0.4 Si, 0–.015 S, 0–1.5 Fe, 0–0.01 B, balance Co |
| D-15 | 14.8–15.8 Cr, 9.5–11.0 Co, 3.0–3.8 Ta, 3.2–3.7 Al, 2.1–2.5 B, 0–0.5 Fe, 0–0.1 Mn, 0–0.05 Ti, 0–0.05 W, 0–0.05 C, 0–0.05 Mo, 0–0.01 S, 0–0.005 Se, 0–0.03 O$_2$, 0–0.03 N$_2$, 0–0.1 TAO, balance Ni |
| Rene 80 | 13.7–14.3 Cr, 9.0–10.0 Co, 4.8–5.2 Ti, 0.01–0.02 B, 2.8–3.2 Al, 3.7–4.3 W, 3.7–4.3 Mo, 9.0–10.0 Co, 0.02–0.1 Zr, 0–0.35 Fe, 0–0.1 Nb, 0–0.1 Ta, 0–0.1 V, 0–0.1 Cu, 0–0.1 Hf, 0–0.01 Mg, 0–0.03 O$_2$, 0–0.03 N$_2$, balance Ni, with W and Mo combined at least 7.70 and N$_{v3}$ (PhaComp Electron Vacancy number) being a maximum of 2.32 |

Low temperature alloys that may be used as part of the metal powder include those brazing alloys listed at column 2, lines 22–45 the Rafferty patent. Appropriate high temperature alloys are limited to 0.15% boron (by weight).

Preferred ranges (by weight) of components of casting mix 10 from which flexible tape 20 is formed are, again, 80–90% metal powder and 20–10% casting vehicle, although with the casting vehicle preferably containing 6–12% PTFE. The metal powder preferably includes two alloys, one having a high melting point and the other, a brazing alloy, having a melting point lower than those of the other alloy and substrate. When heated to the melting point of the brazing alloy, tape 20 attaches to the substrate and any boron present diffuses interstitially. After brazing the composition desirably is similar to that of the (typically cast) substrate.

In preferred embodiments of the invention, the casting vehicle comprises a commercially-available organic binder used in an aqueous solution. Suitable compositions include, but are not limited to, polyacrylic resin, glycerol, propylene glycol, and water. The PTFE included with the casting vehicle is powdered, with a preferred particle size of 8–15 μm. Acrylic powder possibly could be substituted for PTFE. Other alternatives for PTFE include inert organic powders that do not dissolve in the casting vehicle and inhibit the metal powder from bonding as well yet allow some sintering.

The present invention additionally encompasses any adhesive that provides an adequate bond between the flexible tape and substrate without adversely affecting the properties of the final brazed product. Accordingly, the adhesive should not promote shrinkage of the tape or cracks on its surface. Preferred adhesives are compositions containing sodium silicate, including solutions of sodium silicate in which each sixty grams of sodium silicate is dissolved in forty grams of water. As noted above, inorganic substances such as boric acid, sodium tetraborate, sodium fluoride, and sodium aluminum fluoride (including solutions thereof), as well as pastes formed of the materials used to make the tapes, may be used as alternative adhesives. Other suitable adhesives include vehicles having both sodium silicate and metal powder similar to that of the flexible tape.

Unlike the organic adhesives disclosed in the Breton patent, which decompose at temperatures (e.g. 200° C.) substantially lower than the melting point of the brazing alloy, the inorganic adhesives included within the present invention do not. Thus, they continue to adhere tape 20 to the substrate even when heated to standard brazing temperatures. Although the inorganic solutions often will be applied directly to the substrate, moreover, they may be applied to tape 20 or to both tape 20 and the substrate as well.

The invention may be further understood by reference to the following (non-limiting) examples:

EXAMPLE 1

Experimental evidence suggests that at least some flexible tapes lacking PTFE exhibit either unacceptable cracks caused by shrinkage or unacceptable shrinkage itself. In one such experiment, a flexible tape is formed of an atomized powder of composite alloy mixed with a water-based casting vehicle of polyacrylic resin binder with glycerol as a plasticizer. Using a doctor blade to control its thickness, the tape is cast onto a Mylar film and, when dried, has a thickness between 10–70 mil. After being cut into a rectangular shape, the tape is attached to a substrate of 347 stainless steel and vacuum brazed to the substrate. Brazing causes linear shrinkage of the tape, although no surface cracks are apparent. Alternatively, adhering the tape to the substrate using a sodium silicate solution creates surface cracks.

EXAMPLE 2

By contrast, including PTFE in the mixture improves these results. Inert organic powders that do not dissolve in the casting vehicle, such as PTFE, apparently prevent the metallic powder from bonding as well, thereby forming numerous microcracks rather than few large, visible cracks as brazing commences. As the temperature increases and the alloys begin to liquify, the microcracks are filled to form a dense layer of material.

As shown in the chart below, various quantities (by weight) of PTFE added to the casting vehicle of EXAMPLE 1 alter the linear shrinkage characteristics of the resulting flexible tape:

| Experiment No. | PTFE Percent | Shrinkage Percent |
| --- | --- | --- |
| 1 | 4 | 4 |
| 2 | 8 | 2.5 |
| 3 | 10 | 0.5 |
| 4 | 0 | 10.0 |

The casting vehicle is mixed with metal powder in the weight ratio 16:84 and brazed, in an inverted position, to 347 stainless steel using sodium silicate adhesive. Although in each instance the tape remains attached to the metal substrate, in Experiment No. 4 (i.e. without PTFE) it exhibits unacceptable surface cracks (consistent with EXAMPLE 1).

EXAMPLE 3

A flexible metal tape is formed by mixing 16% (by weight) of a casting vehicle consisting of polyacrylic resin, glycerol, and water with 84% (by weight) of an atomized powder including X-40 and AMS 4783B alloys, contacting the mixture with a doctor blade to provide a thickness of 75 mils, and drying the mixture on a Mylar sheet. The powder comprises 35% X-40 alloy and 65% AMS 4783B alloy. Once dried, the tape has a thickness of 40 mils (resulting from solvent evaporation) and is cut into strips measuring 2.5"×0.5".

The following water-based solutions are used to adhere the strips to a substrate of 347 stainless steel:

| Experiment No. | Solution |
| --- | --- |
| 1 | 20% sodium silicate |
| 2 | 30% sodium silicate |
| 3 | 40% sodium silicate |
| 4 | 60% sodium silicate |
| 5 | 80% sodium silicate |
| 6 | concentrated solution of sodium tetraborate |

The strips are then brazed (1200° C. at $10^{-5}$ torr for thirty minutes) to the substrate in an inverted position. The strips used in Experiment Nos. 1, 2, and 6 at least partially disengage from the substrate, and all strips show unacceptable surface cracks.

EXAMPLE 4

Experiments of EXAMPLE 3 are repeated using a 60% solution of sodium silicate in water as an adhesive and with the following quantities of PTFE (by weight) added to the casting vehicle:

| Experiment No. | PTFE Percent | Shrinkage Percent |
| --- | --- | --- |
| 1 | 4 | 4 |
| 2 | 8 | 2.5 |
| 3 | 10 | 0.5 |

Brazing under conditions identical to EXAMPLE 3 completely bonds each strip to the substrate with the shrinkages shown above, with that reported in Experiment No. 3 due mainly to corners of the tape rounding as the alloys partially melts. Surface cracks are not visible.

EXAMPLE 5

Metal Powders are prepared as follows:

| Experiment No. | Composition (By Weight) |
| --- | --- |
| 1 | 50% X-40; 50% AMS 4783B |
| 2 | 40% X-40; 60% AMS 4783B |
| 3 | 35% X-40; 65% AMS 4783B |
| 4 | 30% X-40; 70% AMS 4783B |

Each metal powder is then mixed with a casting vehicle in the ratio 86:14 (by weight) to form the flexible tape and smoothed onto a Mylar sheet. The casting vehicle contains 10% PTFE.

After drying, the tape measures 40 mils thick and is cut into strips 2.5" long and 0.5" wide. The strips thereafter are adhered to 347 stainless steel using a solution of 60% sodium silicate and brazed at 1200° C. at $10^{-5}$ torr for thirty minutes. Surface cracks again are not visible.

FIGS. 2A–D present end views of the respective brazed structures following each of Experiment Nos. 1–4. Decreasing the quantity of X-40 alloy in the flexible tape increases the amount of liquid phase exuded (see FIGS. 2C–D), enhancing the ability of the flexible tape to fill gaps or spaces present in the substrate. By contrast, FIGS. 2A–B show that the flexible tape of Experiment Nos. 1 and 2 exudes lesser liquid phase alloy.

EXAMPLE 6

Metal Powders are prepared as follows:

| Example No. | Composition (By Weight) |
| --- | --- |
| 1 | 60% PWA 1185-1; 40% PWA 1185-2 |
| 2 | 60% X-40; 40% D-15 |
| 3 | 50% Rene 80; 50% D-15 |

Each metal powder is then mixed with a casting vehicle containing 10% PTFE to form a flexible tape of 86% metal powder and 14% casting vehicle. A 60% solution of sodium silicate adhesive adheres the flexible tape to a substrate made of 347 stainless steel. Brazing the tape to the substrate at appropriate temperatures produces excellent results.

EXAMPLE 7

A metal powder containing 60% PWA 1185-1 and 40% PWA 1185-2 is prepared and mixed with a casting vehicle in the ratio 86:14 (by weight) to form a green tape of 30 mils thickness. The casting vehicle contains 10% PTFE. An adhesive containing a 60% solution of sodium silicate is brushed onto a section including both smooth surfaces and the worn air cooling holes of a PWA JT-9 vane. The green tape is used to cover the section, dried, and vacuum brazed. Although the tape completely adheres to the smooth surface of the vane, if does not adhere fully over the cooling holes. However, repeating the experiment using as the adhesive a slurry similar to the casting mix (but lacking PTFE) permits an excellent braze even over the cooling holes.

EXAMPLE 8

Paste adhesives are prepared from metal powders and casting mixes without PTFE but containing either 0%, 2%, 4%, or 8% (by weight) sodium silicate. Each adhesive is brushed onto a sheet of 410 stainless steel. A green tape having dimensions 2.5"×0.4"×0.040" is then gently pressed onto the each adhesive and dried. Peel tests conducted on the dried tapes yield the following results:

| Percentage of Added Sodium Silicate | Peel Test Result |
| --- | --- |
| 0 | fair |
| 2 | fair |
| 4 | strong |
| 8 | very strong |

Additional samples prepared as described above adhere tapes to the substrate while brazed in inverted positions.

The foregoing is provided for purposes of illustrating, explaining, and describing embodiments of the present invention. Modifications and adaptations to these embodiments will be apparent to those of ordinary skill in the art and may be made without departing from the scope or spirit of the invention.

I claim:

1. A brazing system comprising:

a. an organic bonded, flexible metal tape consisting essentially of, by weight, 95–99% of a brazing alloy and a second alloy having a melting point between approximately 1300°–1600° C. and 5–1% of solids of a casting vehicle containing polytetrafluoroethylene as an inert organic substance; and b. means, comprising an inorganic composition selected from the group consisting of sodium silicate, boric acid, sodium tetraborate, sodium fluoride, and sodium aluminum fluoride, for adhering the flexible metal tape to a substrate.

2. A system according to claim 1 in which the flexible metal tape contains, by weight, 0.4–3.0% polytetrafluoroethylene.

3. A system according to claim 2 in which the inorganic adhering means is a solution of at least 40% sodium silicate.

4. A brazing system comprising:

a. an organic bonded, flexible metal tape comprising a brazing alloy and an inert organic substance; and b. means, comprising a paste containing a powdered alloy, for adhering the flexible metal tape to the substrate.

5. A system according to claim 4 in which the adhering means further comprises sodium silicate.

6. A system according to claim 4 in which the flexible metal tape further comprises a second alloy having a melting point between approximately 1300°–1600° C.

7. A system according to claim 6 in which the flexible metal tape consists essentially of, by weight, 95–99% of the brazing and second alloys and 5–1% of solids of a casting vehicle containing polytetrafluoroethylene as the inert organic substance.

8. A system according to claim 7 in which the flexible metal tape contains, by weight, 0.4–3.0% polytetrafluoroethylene.

* * * * *

UNITED STATES PATENT AND TRADEMARK OFFICE
CERTIFICATE OF CORRECTION

PATENT NO. : 5,577,655
DATED : November 26, 1996
INVENTOR(S) : Howard Mizuhara

It is certified that error appears in the above-indentified patent and that said Letters Patent is hereby corrected as shown below:

Column 2, line 30, delete "1300°-600° C" and insert --1300°-1600° C--

Column 4, line 26, delete "O2" and insert --$O_2$--

Column 4, line 50, insert --of-- after "22-45"

Signed and Sealed this

Sixth Day of May, 1997

Attest:

BRUCE LEHMAN

Attesting Officer

Commissioner of Patents and Trademarks